(12) United States Patent
Eurich et al.

(10) Patent No.: US 10,077,846 B2
(45) Date of Patent: Sep. 18, 2018

(54) DIAPHRAGM VALVE

(71) Applicant: Buerkert Werke GmbH, Ingelfingen (DE)

(72) Inventors: Werner Eurich, Bretzfeld-Unterheimbach (DE); Ralf Kettemann, Neuenstein-Kirchensall (DE)

(73) Assignee: Buerkert Werke GmbH, Ingelfingen (DE)

( * ) Notice: Subject to any disclaimer, the term of this patent is extended or adjusted under 35 U.S.C. 154(b) by 88 days.

(21) Appl. No.: 15/134,527

(22) Filed: Apr. 21, 2016

(65) Prior Publication Data

US 2016/0312906 A1  Oct. 27, 2016

(30) Foreign Application Priority Data

Apr. 23, 2015  (DE) .................... 20 2015 102 015 U

(51) Int. Cl.
*F16K 7/12* (2006.01)
*F16K 27/02* (2006.01)
(Continued)

(52) U.S. Cl.
CPC ............ *F16K 7/126* (2013.01); *F16K 17/196* (2013.01); *F16K 27/0236* (2013.01); *F16K 27/0281* (2013.01); *F16K 51/00* (2013.01)

(58) Field of Classification Search
CPC .. F16K 7/126; F16K 27/0236; F16K 27/0281; F16K 17/196; F16K 51/00; F16K 7/12
(Continued)

(56) References Cited

U.S. PATENT DOCUMENTS 2,218,318 A * 10/1940 Pfauser .................... 137/614.04
4,002,186 A *  1/1977 Fink et al. ............... 137/614.03
(Continued)

FOREIGN PATENT DOCUMENTS

DE  3532157 A1  3/1987
DE  3820762 A1  2/1989
(Continued)

OTHER PUBLICATIONS

German Search Report dated May 27, 2015 from corresponding DE Application No. 202015102015.5, 5 pages.

*Primary Examiner* — Marina Tietjen
(74) *Attorney, Agent, or Firm* — Dilworth IP, LLC

(57) ABSTRACT

A diaphragm valve has a valve body which includes at least one flow passage for fluid flow, a valve drive including a housing, and a diaphragm which can be deflected by the valve drive, in order to selectively open and close the flow passage. The rim of the diaphragm is axially clamped in a fluid-tight way between valve body and valve drive, wherein clamping of the diaphragm is effected by a screw-nut connection and the screw and the nut surround the rim of the diaphragm as seen in actuating direction of the valve drive and one of the two parts formed by screw and nut is non-rotatably provided at the valve body or at the valve drive. The other one of the two parts can be screwed in or on and additionally is rotatorily movable. The movable part is supported on the valve drive or on the valve body by an anti-friction bearing.

18 Claims, 6 Drawing Sheets

(51) Int. Cl.
*F16K 51/00* (2006.01)
*F16K 17/196* (2006.01)

(58) Field of Classification Search
USPC .............. 251/331, 335.2; 137/315.27; 3/331, 3/335.2
See application file for complete search history.

(56) References Cited

U.S. PATENT DOCUMENTS

| | | | |
|---|---|---|---|
| 4,567,924 A * | 2/1986 | Brown | 141/207 |
| 6,279,608 B1 * | 8/2001 | Langeveld | 137/557 |
| 2004/0200535 A1 * | 10/2004 | Carringer et al. | 137/615 |
| 2010/0140528 A1 | 6/2010 | McLennan | |

FOREIGN PATENT DOCUMENTS

| DE | 10153362 B4 | 4/2005 |
|---|---|---|
| DE | 202013102526 U1 | 6/2013 |

\* cited by examiner

DIAPHRAGM VALVE

FIELD OF THE INVENTION

This invention relates to a diaphragm valve.

BACKGROUND

Such generic diaphragm valve is known from DE 101 53 362 B4. The attachment of the housing of the valve drive to the valve body is effected by a union nut which engages a lateral flange of the valve body and is rotatorily movable relative to the same and which engages into an external thread of a sleeve-like tab protruding from the valve body. The generic diaphragm valves to which the present invention relates do not employ a plurality of screws which extend through flanges at the valve body and at the housing in actuating direction of the valve drive, but there is employed a singular screw-nut connection which circumferentially and externally surrounds the diaphragm. As can be seen in DE 101 53 362 B4, the union nut is attached at the end of the valve drive facing away from the valve body and then is screwed on. The valve housing thereby is urged against the diaphragm, so that the diaphragm rim is axially clamped and tight between two ring-shaped bearing surfaces. The drive itself then engages the diaphragm via a tappet, in order to lift or lower said diaphragm, whereby the flow passage can be opened and closed. The valve body therefor has a valve seat. In a tubular valve body this valve seat usually is designed as at least one shut-off web which extends transversely to the flow passage and which together with the diaphragm, when the same rests against the same, shuts off the flow passage.

For the secure sealing and retention of the diaphragm it is important to clamp the same with a relatively closely predetermined contact pressure. A high frictional force occurs for example due to the dimensions of the threads and the contact surfaces between union nut and housing of the valve drive. Due to this high resistance it is relatively difficult to exactly achieve the desired optimum axial clamping force for the diaphragm during assembly or after a repair. In addition, it is disadvantageous to always have to design the union nut as large mounting part, because it must be attached across the valve drive. This also limits the lateral dimensions of the valve drive including housing, ports etc. The fact that the screw and the nut surround the diaphragm at its rim in actuating direction, more exactly in the region of the rim (i.e. along its rim), of course does not mean that the screw and the nut must be located at the height of the diaphragm as seen in a side view, as here the view in actuating direction is important.

It is the object of the invention to avoid the above disadvantages.

SUMMARY

The present invention provides a diaphragm valve, comprising a valve body which includes at least one flow passage for fluid flow, a valve drive including a housing, and a diaphragm which can be deflected by the valve drive, in order to selectively open and close the flow passage, wherein the rim of the diaphragm is axially clamped in a fluid-tight way between valve body and valve drive and clamping of the diaphragm is effected by a screw-nut connection in which the screw and the nut surround the rim of the diaphragm as seen in actuating direction of the valve drive and one of the two parts formed by the screw and the nut is non-rotatably provided at the valve body or at the valve drive, and wherein the other one of the two parts can be screwed in or on and is rotatorily movable. The movable part, namely the screw or the nut, is supported on the valve drive or on the valve body via an anti-friction bearing. The non-movable part then is firmly mounted on the counterpart, i.e. on the valve body or valve drive.

The anti-friction bearing reduces the friction between the movable part and the part on which it is mounted, i.e. either on the valve drive or on the valve body, so that the torque applied when screwing the screw and the nut into each other almost completely is converted into the necessary clamping force and the clamping force can be predetermined very exactly. The friction losses are minimal. Thus, the torque applied is distinctly smaller and the tool requires a smaller lever arm. This is very advantageous in confined space conditions in the plants.

The non-movable part, hence either the screw or the nut, i.e. the one of the two parts which is not rotated for screwing, can be designed as separate part or as an integrally molded tab of the valve body or the valve drive, here in particular of the housing.

The housing of the valve drive need not be designed in one part, it in particular is designed in several parts.

The invention in addition provides that the diaphragm preferably is axially clamped directly between the valve drive, in particular the housing, and the valve body, without any interposed parts.

Preferably, the valve drive also is attached to the valve body by means of the screw-nut connection, in particular attached only by the same.

There can be provided an axial guidance which the housing forms with the valve body, via which the housing is guided laterally to the valve body, preferably is guided without clearance within the positional tolerances. Before engagement of the screw into the nut, valve drive and valve body hence are aligned relative to each other and fitted into each other. The correct position of the diaphragm relative to the sealing surfaces on both sides also is optimized therewith from the outset.

At the end face of the housing a circumferential ring tab can protrude towards the valve body. This ring tab is guided laterally on a protruding sleeve-shaped tab provided on the valve body, in order to form the axial guidance. Alternatively or in addition, the ring tab can clamp the diaphragm rim at the end face of the housing, i.e. directly rest against the same. In one variant, a dual function thus is realized by the ring tab.

At the valve body an annularly closed circumferential sealing surface can be formed for the rim of the diaphragm, against which the diaphragm is pressed. This sealing surface is surrounded by the sleeve-shaped tab. The diaphragm hence also is protected against influences from outside.

One variant of the invention provides that on the sleeve-shaped tab a thread, in particular the external thread is formed by forming the screw. Separate parts attached to the valve body for forming the external thread hence are not required.

To prevent too much compression of the diaphragm, an axially acting stop can be provided. One variant provides that the sleeve-shaped tab includes an axial stop for the housing, in particular in that the sleeve-shaped tab has a shoulder against which a shoulder of the ring tab can abut.

On the valve body, around the diaphragm, the external thread can be formed. Hence, no part mounted on the valve body, which forms the external thread, is necessary.

In particular, the external thread is formed on the sleeve-shaped tab of the valve body.

The movable one of the two parts optionally is the nut which is formed as union nut. Since the nut is located on the outside, it is easier in this variant to grasp it with a tool.

Between the inside of the nut and the housing the rolling elements, i.e. the anti-friction bearing can be located.

Quite generally, the anti-friction bearing can hold and guide the movable part in lateral direction and/or in axial direction, in particular without a further plain bearing being present in this or these directions between the movable part and its associated part (valve body or valve drive).

When the rolling elements lie between nut and housing, bearing grooves can be formed for the rolling elements on the nut and on the housing to reduce the number of parts. Thus, no extra bearing shells are present. However, this is not to be understood in a limiting sense.

For mounting the nut or the screw a closable filling opening for rolling elements can be provided in the valve body or in the housing. This means that the screw or the nut, which both are designed as ring-shaped parts, are mounted on their associated counterpart (valve body or valve drive) in the sense of being pushed onto the same. Subsequently, the rolling elements are introduced via the filling opening, so that via the anti-friction bearing a form-fit connection is realized between the screw or the nut and the valve body or valve drive.

The anti-friction bearing in particular is a grooved ball bearing, advantageously an angular-contact ball bearing, so that it can absorb radial, but also axial forces.

Housing and valve body can firmly be positioned relative to each other circumferentially via a positive anti-rotation protection, namely already with non-actuated screw-nut connection. This means that housing and valve body are fitted into each other, the anti-rotation protection takes effect, and when subsequently screwing screw and nut into each other, housing and valve body are not able to rotate with the same. Circumferential movements and shear forces acting on the diaphragm also are prevented therewith.

The limitation which in the prior art consists in that the union nut has an inside diameter which is larger than the largest diameter or cross-section of the valve body can be eliminated by the invention, as the movable one of the two parts optionally has an inside diameter which is smaller than the outside diameter of the housing and only is mountable from the valve-body-side end of the housing. Hence, the movable one of the two parts (screw or nut) is put onto the valve body or the valve drive, namely in the region of the connection to the opposed part, which becomes possible by the anti-friction bearing and in particular by the subsequently incorporated rolling elements (but is not absolutely necessary for this purpose).

It should also be emphasized that in the present case a bayonet lock also is to be regarded as screw-nut connection.

The valve drive itself can be a manual, pneumatic, hydraulic or electric drive.

The wear in the region of the attachment of the valve drive to the valve body also is almost excluded by the invention.

DETAILED DESCRIPTION

Figure 1:
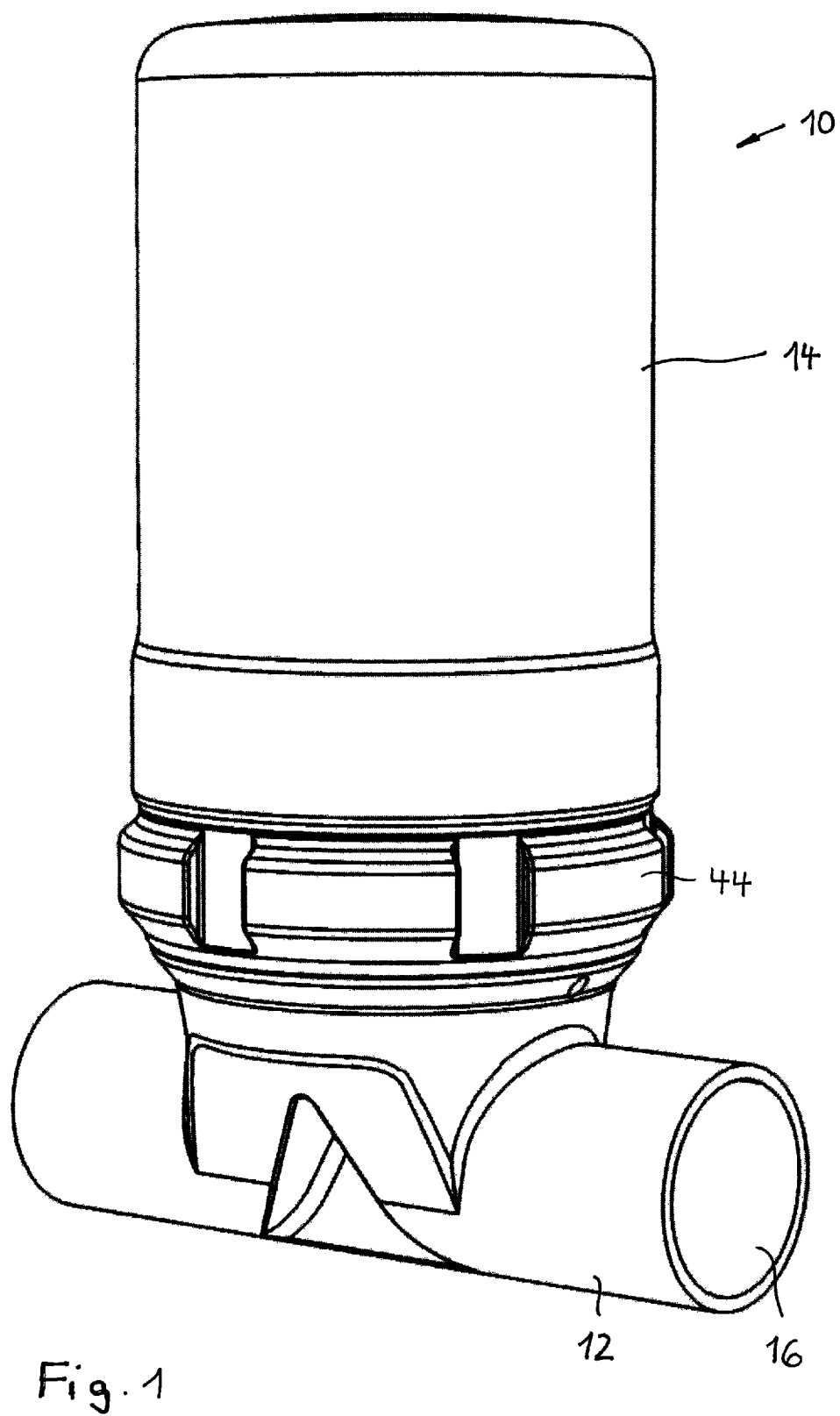
FIG. 1 shows a side view through a possible embodiment of the diaphragm valve according to the invention.

FIG. 1 shows a diaphragm valve 10 which includes a valve body 12, here in the form of a tube, and a valve drive 14 attached to the valve body 12.

As mentioned, the valve body in this embodiment is tubular and has a flow passage in its interior, the outlet 16 of which is shown in FIG. 1. The flow passage in the valve body 12 selectively can be interrupted or opened by the valve drive 14, in order to close or open the valve.

Preferably, this is not to be understood in a limiting sense, the valve body 12 can be an integral part, which is formed or which is manufactured by casting. Useful materials include metals or plastic materials.

Figure 2:
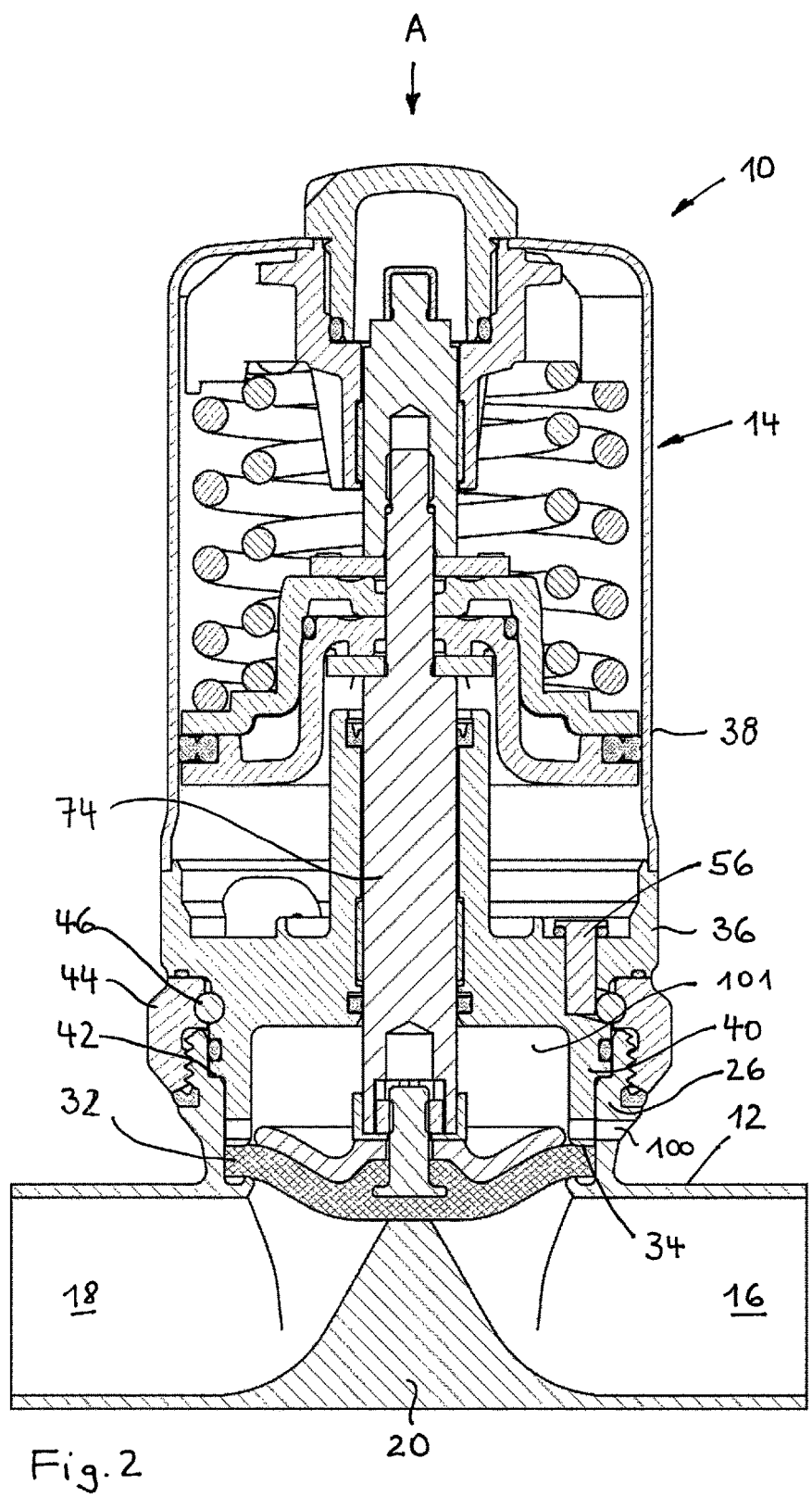
FIG. 2 shows a longitudinal sectional view through the diaphragm valve according to FIG. 1.

Beside the outlet 16, FIG. 2 also shows the inlet 18 of the flow passage. A shut-off web 20 between inlet 18 and outlet 16 laterally extends into the flow passage and divides the same into two portions. The upper side 22 of the shut-off web 20 (see FIG. 6) points to the outside laterally to the tube axis, as in this region the valve body 12 is open and has an opening 24 in which inlet 18 and outlet 16 are in flow connection with each other when the valve 10 is open.

Figure 6:
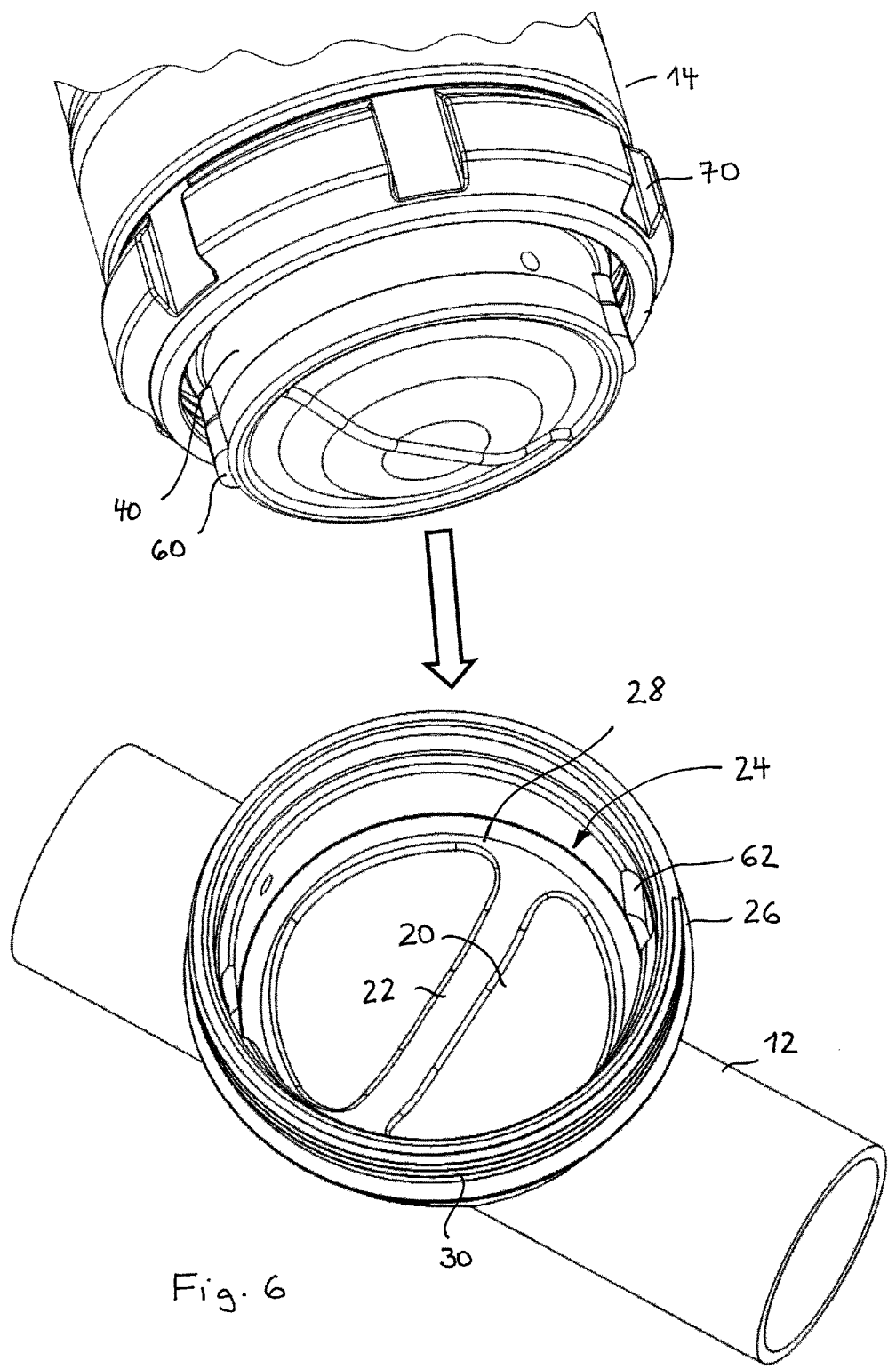
FIG. 6 shows a perspective top view of the valve body in the region of its receiving opening for the valve drive and the underside of the valve drive before fitting into each other.

The valve body 12 has an integrally molded sleeve-shaped tab 26 which completely surrounds the opening 24 and on the inside adjoins a substantially planar ring-shaped sealing surface 28 formed there. The sealing surface 28 transitions into the upper side 22 of the shut-off web 20, as shown in FIG. 6.

On the radial outer side of the sleeve-shaped tab 26 an external thread 30 is formed. The sleeve-shaped tab 26 thus forms a hollow screw.

Between the valve drive 14 and the valve body 12 a diaphragm 32 is clamped (see FIG. 2). At its outer circumferential rim, the diaphragm on one side substantially fully rests on the sealing surface 28. The diaphragm 32 is axially clamped between its opposite sides and hence is sealed in that on the opposite side the valve drive 14 presses against the same. For this purpose, the valve drive 14 has a sealing surface 34 opposite the sealing surface 28 (see FIGS. 2 and 7).

The part of the valve drive 14 provided with the sealing surface 34 is an attached housing part 36 of the multi-part outer housing of the valve drive 14. The attached housing part 36 closes a pot-shaped main housing 38, which accommodates the drive system, towards the valve body 12.

In the present case, the attached housing 36 has a circumferential ring tab 40 protruding from its end face, which with its outside dimensions is adjusted to the inside dimensions of the sleeve-shaped tab 26, so that the ring tab 40 and the sleeve-shaped tab 26 serve an axial guidance for the valve drive 14 when the valve drive 14 is put onto the valve body 12. The fits between these two tabs 26, 40 are made such that there is a substantial freedom from radial clearance.

The sleeve-shaped tab 26 has a radial shoulder, just like the ring tab, which in the assembled condition of the valve 10 abut against each other and rest on each other, in order to form an axial stop 42.

The attachment of the valve drive 14 to the valve body 12 is effected via a screw-nut connection, which is realized with a nut 44 which in the present case is supported on the valve drive 14 and with the external thread 30 on the sleeve-shaped tab 26.

The nut 44 just like the external thread 30 completely surrounds the diaphragm 32 as seen in axial direction A of the valve drive (direction of movement of the valve drive 14). Consequently, only one central screw-nut connection is required.

In the present case it is the nut 44 which is rotatably mounted on the valve drive 14 via an anti-friction bearing with rolling elements 46.

Figure 5:
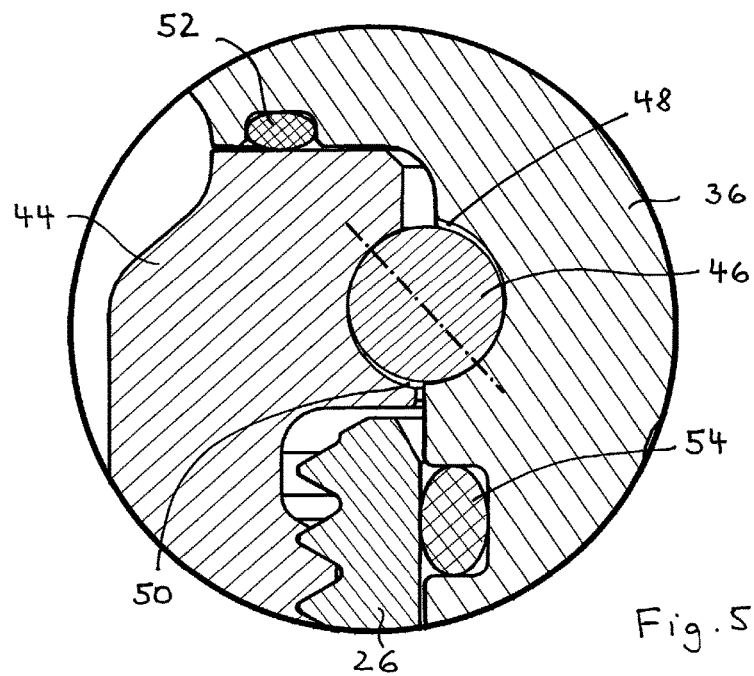
FIG. 5 shows a greatly enlarged view of the portion designated with X in FIG. 4.

The bearing is designed as ball bearing, more exactly as angular-contact ball bearing, as shown more exactly in FIG. 5.

The rolling elements 46 run in bearing grooves 48, 50 in the nut 44 or in the housing of the valve drive 14.

The anti-friction bearing is designed such that it is responsible both for the radial and for the axial support of the nut 44 on the housing. In this connection FIG. 5 shows which part of the grooves 48 and 50 supports when the nut 44 is tightened. Corresponding gaps between the grooves 48, 50 and the rolling element 46 show where no power transmission occurs.

In this region, a seal 52 between an end face of the nut 44 and the housing provides an additional sealing, just like a further ring seal 54 between the outer circumferential surface of the ring tab 40 and the inside of the sleeve-shaped tab 26.

The nut 44 has a smallest inside diameter which is distinctly smaller than the outside diameter of the housing, so that the nut need not be attached and mounted from above, with respect to FIG. 2, via the housing, as is the case in the prior art, and thus does not laterally protrude extremely beyond the outer housing.

In the illustrated embodiment, the nut 44 already is attached to the valve drive 14 in advance and need not be traded as a loose part. Attaching the nut 44 rather is effected from the ring tab 40, onto which the nut is pushed. In this condition, the rolling elements 46 are not present yet. The rolling elements 46 are inserted from inside from the interior of the housing via a releasable plug 56 (see FIG. 2), in order to fill up the annular space between the guiding grooves 48, 50.

Figure 3:
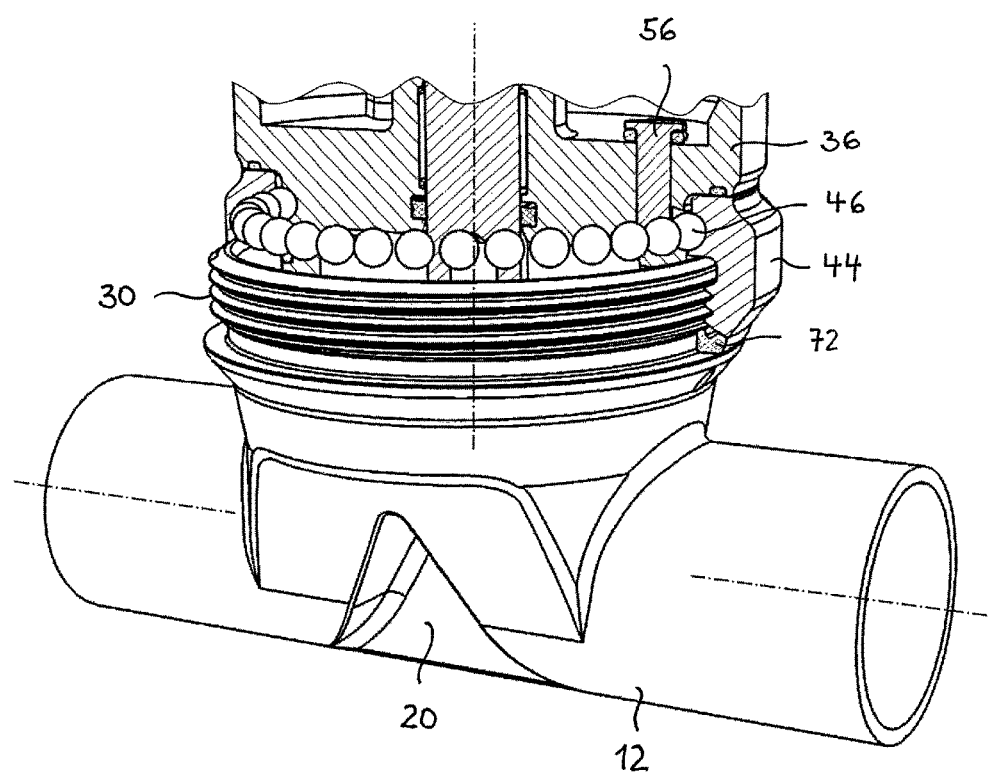
FIG. 3 shows a perspective sectional view through the diaphragm valve according to FIG. 1 in the region of the attachment of valve body and actuating drive.
Figure 4:
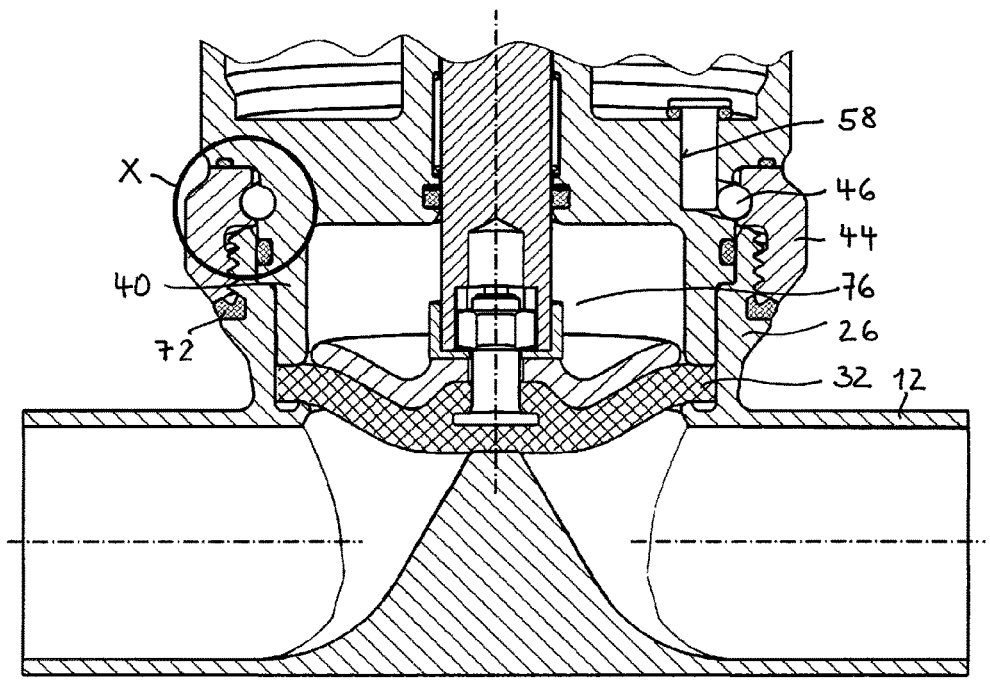
FIG. 4 shows an enlarged longitudinal sectional view in the region of the attachment of valve body and valve drive.

In particular, this is not to be understood in a limiting sense, this annular space circumferentially is filled with rolling elements for at least 50%, in particular filled with rolling elements for at least 90% (see FIG. 3). The filling opening bears the reference numeral 58, see FIG. 4.

Figure 7:
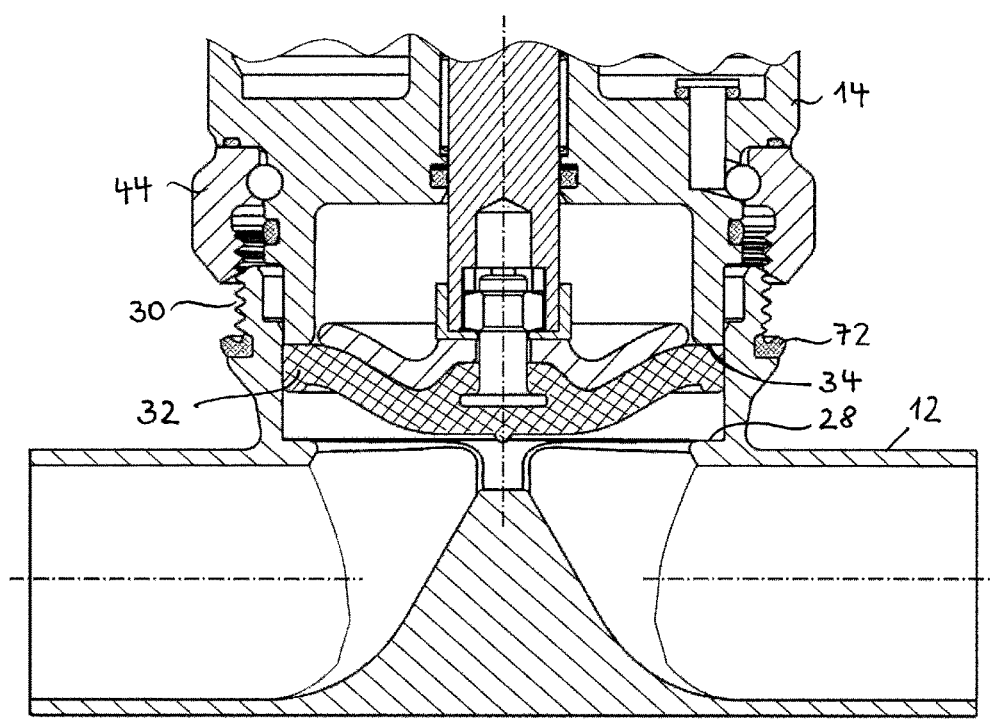
FIG. 7 shows a sectional view corresponding to FIG. 4 when the valve drive is attached to the valve body, but the screw-nut connection has not yet been closed.

The assembly of the diaphragm valve is effected as shown in FIGS. 6 and 7. Initially, the valve drive 14 is put into the sleeve-shaped tab 26 with the ring tab 40 first. The two parts are mounted laterally to each other.

A positive anti-rotation protection, in the present case by at least one axially protruding bead 60 and a complementary recess 62 at the ring tab 40 or on the inside of the sleeve-shaped tab 26, see FIG. 6, ensures that the valve drive 14 is aligned and fixed in circumferential direction relative to the valve body 12.

This anti-rotation protection also ensures that on tightening of the nut 44 valve body and/or housing are not rotated with the same.

FIG. 7 shows the nut 44 when it seizes the first thread groove of the external thread 30.

The nut 44, which on its outside has recesses 70 for better torque absorption, subsequently is screwed further onto the external thread 30. During this movement the nut 40 axially pulls the valve drive 14 against the valve body 12 via the anti-friction bearing. The sealing surface 34 rests on the diaphragm 32 and likewise urges the same downwards, until it reaches the sealing surface 28 (see FIG. 7) and there presses against the same. This axial shifting proceeds, until the stop 42 takes effect. At this time, the nut 44 also presses against a ring seal 72 sitting on the sleeve-shaped tab and at the end of the external thread 30, which additionally counteracts a release of the nut 44. The seal 72 also prevents the ingress of dirt into the threads and the anti-friction bearing.

Of the two parts nut and screw 44 the nut here is movable and positively and rotatably attached to the valve drive 14 via an anti-friction bearing. The nut 44, however, might also rotatably and positively be provided at the valve body via an anti-friction bearing, and in this case the valve drive 14 would have an external thread to form the screw.

Conversely, it need not necessarily be the nut 44 which is supported on the valve body 12 or the valve drive 14 via an anti-friction bearing. It might also be the screw with the external thread which is designed as rotatable sleeve and which via an anti-friction bearing is supported either on the valve body 12 or on the valve drive 14. Then, the internal thread, i.e. the nut, preferably would be an integral part of the corresponding other part, i.e. of the valve drive 14 or the valve body 12, and would non-rotatably be attached to this part.

As is common practice in a diaphragm valve, the diaphragm 32 is axially moved via a stem 74, in order to either close the diaphragm valve, as is shown in FIG. 2, by pressing onto the upper side 22 of the shut-off web 20 or by being spaced from the same. The valve stem 74 preferably is positively coupled with the diaphragm 32 via a suitable fastening device 76 (see FIG. 4), in order to transmit the axial movement of the valve stem 74 to the diaphragm 32. At the opposite end of the valve stem 74 the drive mechanism is provided, which according to the exemplary embodiment is designed as pneumatic drive, comprising several springs which effect a pressurization of the valve in closing direction. However, this is not to be understood in a limiting sense. In the housing, an electric drive can be provided just as well, or the valve stem 74 protrudes through the housing to the top out of the same, in order to be actuated manually. Via a leakage bore 100, which leads through the tabs 40 and 26, the space 101 above the diaphragm 32 is ventilated. This is necessary to detect leaky diaphragms 32.

The invention claimed is:

1. A diaphragm valve, comprising a valve body which includes at least one flow passage for fluid flow, a valve drive including a housing, and a diaphragm which is deflected by the valve drive in order to selectively open and close the flow passage, wherein the rim of the diaphragm is axially clamped in a fluid-tight way between valve body and valve drive and clamping of the diaphragm is effected by a screw-nut connection, wherein the screw and the nut surround the rim of the diaphragm as seen in actuating direction of the valve drive and one of either the screw or nut is non-rotatably provided at the valve body or at the valve drive, wherein the other is screwed in or on and is rotatably movable, wherein the rotatably movable part of the two parts is supported on the valve drive or on the valve body by an anti-friction bearing, and wherein a positive anti-rotation protection is activated by fitting one of the housing and the valve body into the other firmly positions the housing and the valve body relative to each other, so that the housing and the valve body are immovable circumferentially prior to closing the screw-nut connection.

2. The diaphragm valve according to claim 1, wherein the valve drive is attached to the valve body by means of the screw-nut connection.

3. The diaphragm valve according to claim 1, wherein the valve drive is attached to the valve body only by the screw-nut connection.

4. The diaphragm valve according to claim 1, wherein the housing with the valve body forms an axial guidance via which the housing is guided laterally to the valve body.

5. The diaphragm valve according to claim 4, wherein on an end face of the housing a circumferential ring tab protrudes, which is guided laterally on a protruding sleeve-shaped tab provided on the valve body, whereby the axial guidance is formed.

6. The diaphragm valve according to claim 5, wherein the ring tab clamps the diaphragm rim.

7. The diaphragm valve according to claim 5, wherein the valve body has a circumferentially closed sealing surface for the rim of the diaphragm, against which the diaphragm is pressed.

8. The diaphragm valve according to claim 7, wherein this sealing surface is surrounded by the sleeve-shaped tab.

9. The diaphragm valve according to claim 5, wherein on the sleeve-shaped tab a thread is formed by forming the screw.

10. The diaphragm valve according to claim 5, wherein the sleeve-shaped tab includes an axial stop for the housing.

11. The diaphragm valve according to claim 10, wherein the axial stop abuts against a shoulder at the ring tab.

12. The diaphragm valve according to claim 1, wherein an external thread is formed on the valve body around the diaphragm.

13. The diaphragm valve according to claim 1, wherein the nut is movable and is formed as union nut.

14. The diaphragm valve according to claim 1, wherein rolling elements are located between the inside of the nut and the housing.

15. The diaphragm valve according to claim 14, wherein on the nut and on the housing bearing grooves are formed for the rolling elements.

16. The diaphragm valve according to claim 1, wherein a closable filling opening for rolling elements is provided in the valve body or in the housing.

17. The diaphragm valve according to claim 1, wherein the anti-friction bearing is an angular-contact ball bearing.

18. The diaphragm valve according to claim 1, wherein the movable one of the screw or nut connection effecting clamping of the diaphragm has an inside diameter which is smaller than the outside diameter of the housing and is mountable only from the valve-body-side end of the housing.

* * * * *